United States Patent
Tamura et al.

[11] Patent Number: 5,947,364
[45] Date of Patent: Sep. 7, 1999

[54] ULTRASONIC WELDING APPARATUS

[75] Inventors: Naoki Tamura; Toshiaki Suzuki, both of Aichi, Japan

[73] Assignees: Harness System Technologies Research, Ltd., Nagoya; Sumitomo Wiring Systems, Ltd., Yokkaichi; Sumitomo Electric Industries, Ltd., Osaka, all of Japan

[21] Appl. No.: 08/732,993

[22] Filed: Oct. 16, 1996

[30] Foreign Application Priority Data

Oct. 20, 1995  [JP]  Japan .................................. 7-272619

[51] Int. Cl.⁶ .................................................. B23K 20/10
[52] U.S. Cl. ........................... 228/1.1; 228/45; 156/580.2
[58] Field of Search ................ 228/1.1, 45, 55; 156/580.1, 580.2; 29/40, 56

[56] References Cited

U.S. PATENT DOCUMENTS

| | | | |
|---|---|---|---|
| 3,780,926 | 12/1973 | Davis | 228/1.1 |
| 4,534,091 | 8/1985 | Kline | 29/2 |
| 4,596,352 | 6/1986 | Knapp | 156/580.1 |
| 4,709,455 | 12/1987 | D'Andrea et al. | 29/39 |
| 4,852,788 | 8/1989 | Patrikios | 228/1.1 |

FOREIGN PATENT DOCUMENTS

| | | |
|---|---|---|
| 0 143 936 | 6/1985 | European Pat. Off. . |
| 0 286 975 | 10/1988 | European Pat. Off. . |
| 33 16 873 A1 | 11/1984 | Germany . |
| 34 37 749 A1 | 4/1986 | Germany . |

OTHER PUBLICATIONS

Patents Abstracts of Japan, vol. 6, No. 67 (E–104), Apr. 28, 1982, JP 57 009241.

*Primary Examiner*—Samuel M. Heinrich
*Attorney, Agent, or Firm*—Oliff & Berridge, PLC

[57] ABSTRACT

An ultrasonic welding apparatus includes an exciter unit for generating ultrasonic vibration; a horn having a forward end and rotatable about a horizontal axis passing through the center of the horn; and a plurality of welding tips projecting from an outer circumferential surface of the forward end of the horn. The welding tips have different sizes and are rotated about the horizontal axis.

6 Claims, 4 Drawing Sheets

ULTRASONIC WELDING APPARATUS

FIELD OF THE INVENTION

The present invention relates to an ultrasonic welding apparatus used for terminal treatment of an electric cable, and the like.

DESCRIPTION OF RELATED ART

In order to perform terminal treatment of a car electric cable, and the like, a conductor core of the electric cable is ultrasonically welded to a socket terminal, or the like.

As shown in FIG. 4, a conventional ultrasonic welding apparatus 23 comprises an exciter unit composed of a booster 3 and a converter 4 connected to each other; a horn 24 projecting forward from the booster 3; and a welding tip 6 provided to project downward from a forward end of the horn 24. When the booster 3 is supplied with electric power through the converter 4, and an object to be welded is positioned between the welding tip 6 and an anvil 14, the welding tip 6 is ultrasonically vibrated by ultrasonic vibrational energy generated from the booster 3 so that the object is welded by heat generated by the vibration of the welding tip 6.

Where terminal treatment of an electric cable is to be performed by a conventional ultrasonic welding apparatus, welding cannot be performed sufficiently unless the shape of the lower surface of the welding tip 6 is fitted to the outer circumferential surface of a conductor core 16, as shown in FIG. 3. Whenever the size of the electric cable to be subjected to terminal treatment is changed, the welding tip 6 must be replaced by a new one having a shape and size fitted to the size of the electric cable.

Conventionally, in order to exchange the welding tip 6, one of the following methods is employed: (1) the horn 24 is detachably attached to the exciter unit so that the welding tip 6 is exchanged together with the horn; or (2) a welding tip 25 is detachably attached to a horn 26 by bolts 27 so that the welding tip 25 is replaced by a new one, as shown in FIGS. 5A and 5B.

In either method, however, the horn 24 or the welding tip 25 is removed and a new one is attached. Thus, a gap is generated in the attaching portion thereby allowing the welding tip to displace as shown by the one-dotted line in FIG. 3. As a result of the displacement, a welding failure is apt to occur. Because the mount position and angle of the welding tip must be finely adjusted at the time of the exchanging of the welding tip, a problem arises in that a long time is required for re-starting the ultrasonic welding apparatus. This problem has become more serious in recent years because of an increased tendency towards multikind and small quantity production.

Further, in the case where terminal treatment of a flat cable containing electric wires different in size is to be performed, the welding tip must be replaced by a new one fitted to each of the electric wires. Thus, the exchange cannot be performed in a short time, for example, on the order of seconds. Ultrasonic welding has not been applied to a flat cable of this type.

It is therefore an object of the present invention to replace the welding tip of an ultrasonic welding apparatus without the necessity of troublesome removing of the horn or the welding tip. Not only the time required for welding treatment can be shortened, but also welding treatment can be applied to a flat cable containing electric wires different in size.

SUMMARY OF THE INVENTION

To solve the aforementioned problems, an ultrasonic welding apparatus is provided comprising a welding tip projecting downward from a forward end of a horn projecting forward from an exciter unit, wherein the horn is made rotatable around a horizontal axis passing through the center of the horn, and a plurality of welding tips are positioned on the outer circumferential surface of a forward end portion of the horn so that the respective top ends of the welding tips are moved to face a subject to be welded one by one successively as the horn rotates. Ultrasonic vibration is generated by the exciter unit through the horn to thereby weld the subject, which is placed on an anvil and is in contact above with one of the welding tips.

When the plurality of welding tips provided so as to project from the horn differ from each other in shape and size, the respective top ends of the welding tips are moved to face the object on the anvil successively if the horn is rotated. Thus, the exchange of the welding tips is completed if the rotation of the horn is stopped when a required welding tip faces the subject.

Because the horn rotates around the horizontal central axis of the horn, the respective welding tips also rotate around the horizontal central axis of the horn. Thus, a required welding tip can be accurately moved to face the subject to be welded if the welding tips are attached around the center axis accurately. The horn may be rotated accurately by means of a stepping motor, or the like.

Further, when the exciter unit and the horn are rotated integrally with each other, the transmission of ultrasonic vibrational energy from the exciter unit to the horn is performed evenly and efficiently regardless of the exchange of welding tips because there is no rotational connection portion between the exciter unit and the horn.

DETAILED DESCRIPTION OF PREFERRED EMBODIMENTS

A preferred embodiment of this invention is explained below in conjunction with the figures. The items in the construction of this invention are employed in the design of the preferred embodiment of the invention. However, the present invention is not limited to the preferred embodiment.

Figure 1:
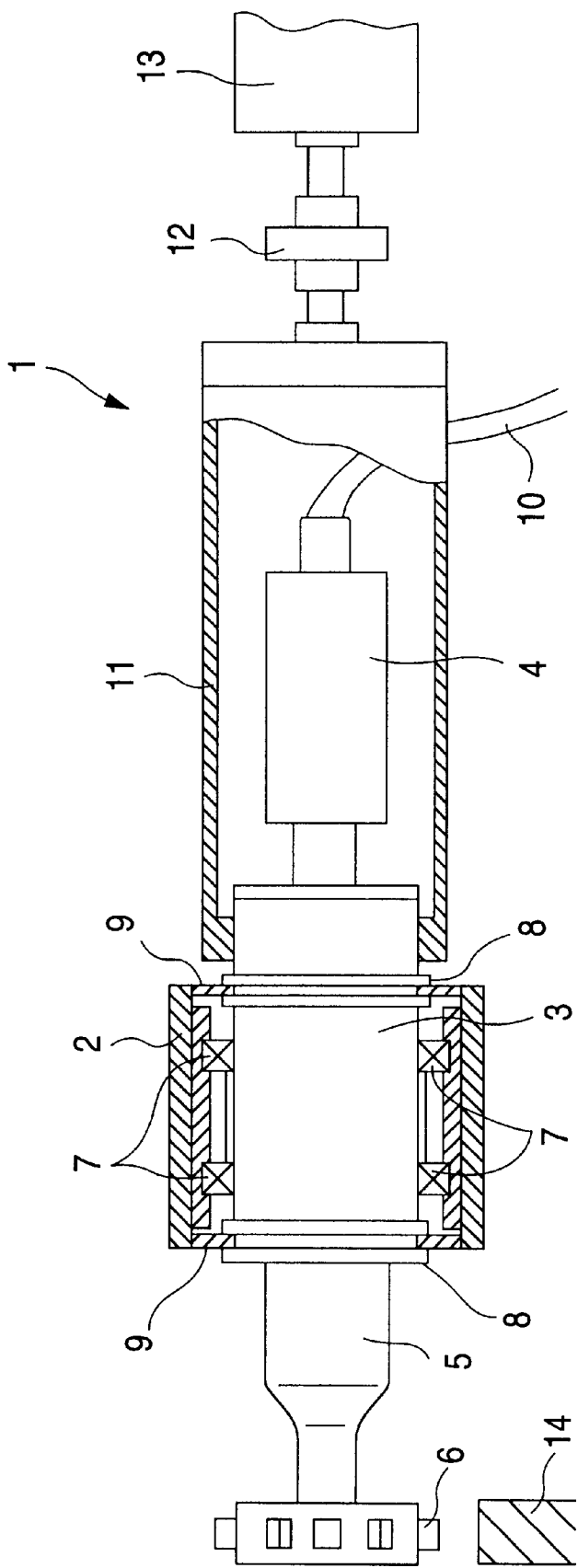
FIG. 1 is a sectional view showing an embodiment of an ultrasonic welding apparatus according to the present invention.

An ultrasonic welding apparatus 1 shown in FIG. 1 is used for terminal treatment of an electric cable, and comprises a booster 3 housed in a rectangular-pipe-shaped shell 2 in a state in which a rear end portion projects from the shell 2; a converter 4 connected to the rear end of the booster 3; a horn 5 extending forward from the booster 3 and projecting out from the shell 2; and welding tips 6 positioned at the front end of the horn 5.

The booster 3 is fixed to the inner wall of the shell 2 through bearings 7 so as to be rotatable. The front and rear surfaces of the shell 2 are blocked by diaphragms 9 mounted on retaining rings 8 respectively.

The converter 4 is connected to an external electric source (not shown) through an electric cable 10 to convert a voltage or current from the external electric source so as to be suitable to the booster 3. The converter 4 is housed in a columnar cylinder 11 having its rear end blocked. The cylinder 11 is fixed at its front end to the outer circumferential surface of the rear end portion of the booster 3.

The horn 5 having a shape rotationally symmetrical with respect to a horizontal longitudinal axis is fixed to the booster 3 so that the axis of symmetry coincides with the rotation axis of the booster 3 with respect to the shell 2.

Figure 2:
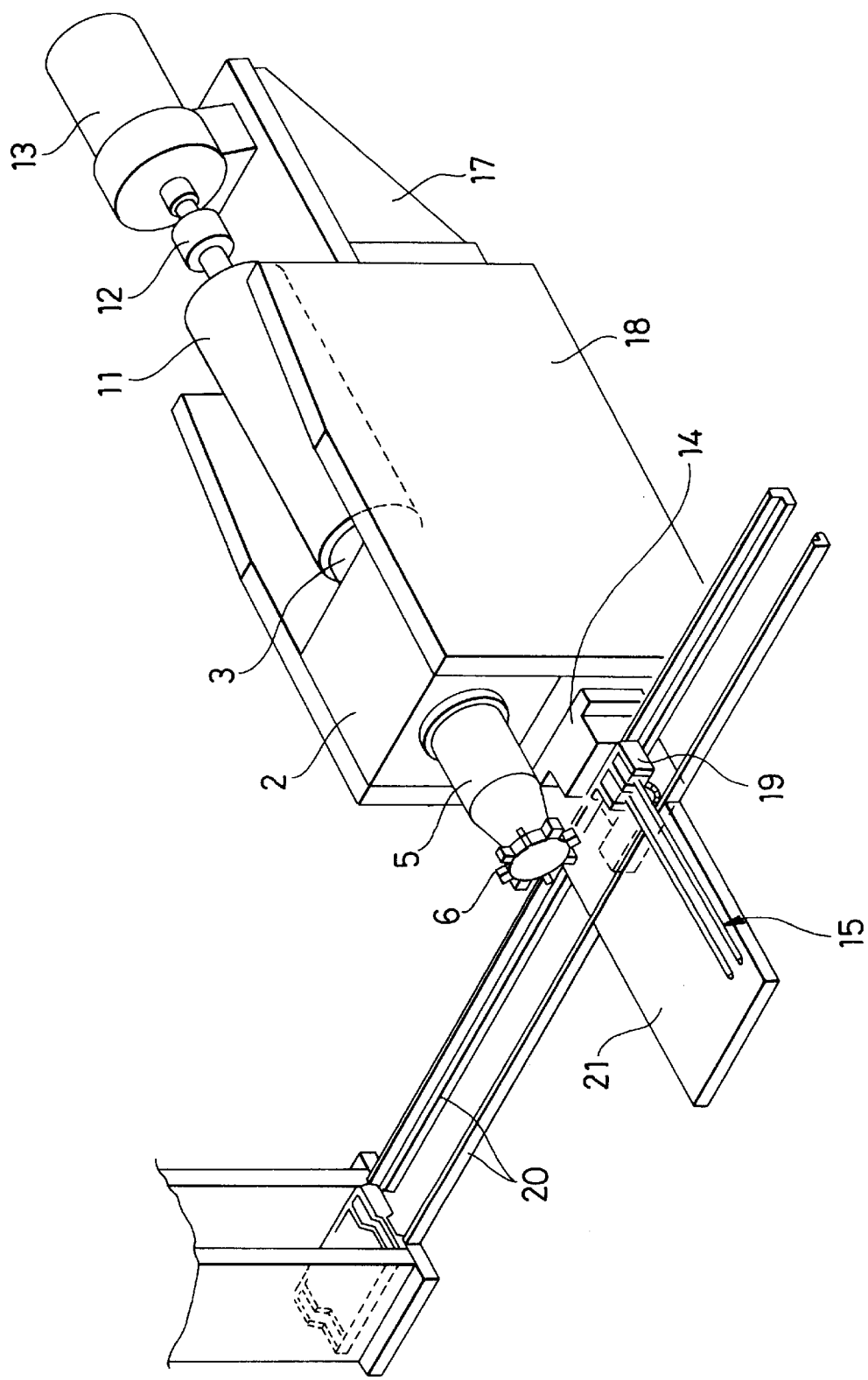
FIG. 2 is a perspective view showing use of the embodiment of FIG. 1.

Further, as shown in FIG. 2, the horn 5 has a front end portion shaped like a disk with a rotation axis as its center. On the outer circumferential surface of the front end shaped like a disk, a plurality of welding tips 6 different in shape and size are provided at equal intervals so as to project outward from the disk. The welding tips 6 are rotated together with the cylinder 11, the booster 3 and the horn 5 around the above-mentioned rotation axis by means of a motor 13 connected to the rear end of the cylinder 11 through a coupling 12 the welding tips face the upper surface of the anvil 14 successively. It is preferable that the motor 13 is a stepping motor which rotates accurately by a predetermined angle to make the horn 5, cylinder 11 and booster 3 rotate so that the top end of a selected welding tip 6 comes into a position to contact a conductor core 16 of an electric cable 15 straightly from above, without any displacement, as indicated by the solid line in FIG. 3.

As shown in FIG. 2, the welding apparatus 1 is fixed on a mount 17 supported at its opposite side portions by a support frame 18. The support frame 18 is provided at its front lower portion with the anvil 14 projecting forward therefrom so that the mount 17 can be moved up and down by an elevating mechanism (not shown) to moderately press the lower surface of one of the selected welding tips 6 to the electric cable 15 on the anvil 14.

Figure 3:
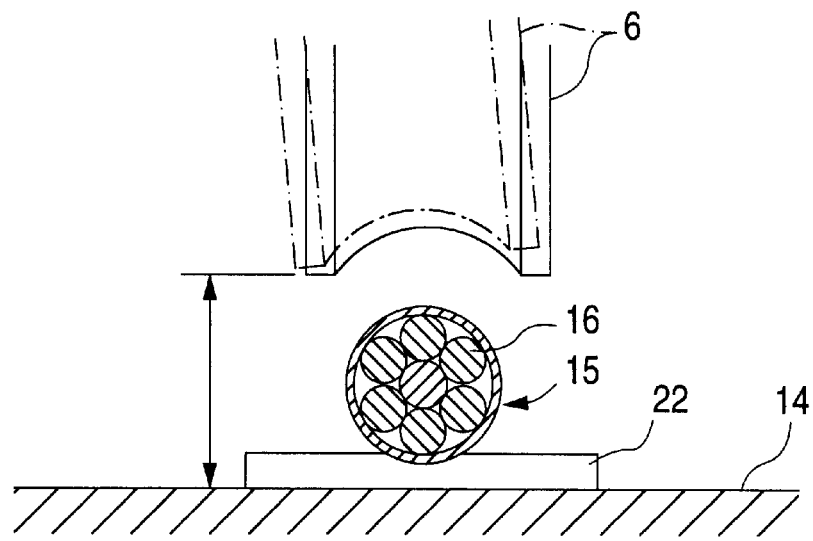
FIG. 3 is a sectional view showing positioning of a welding tip.
Figure 4:
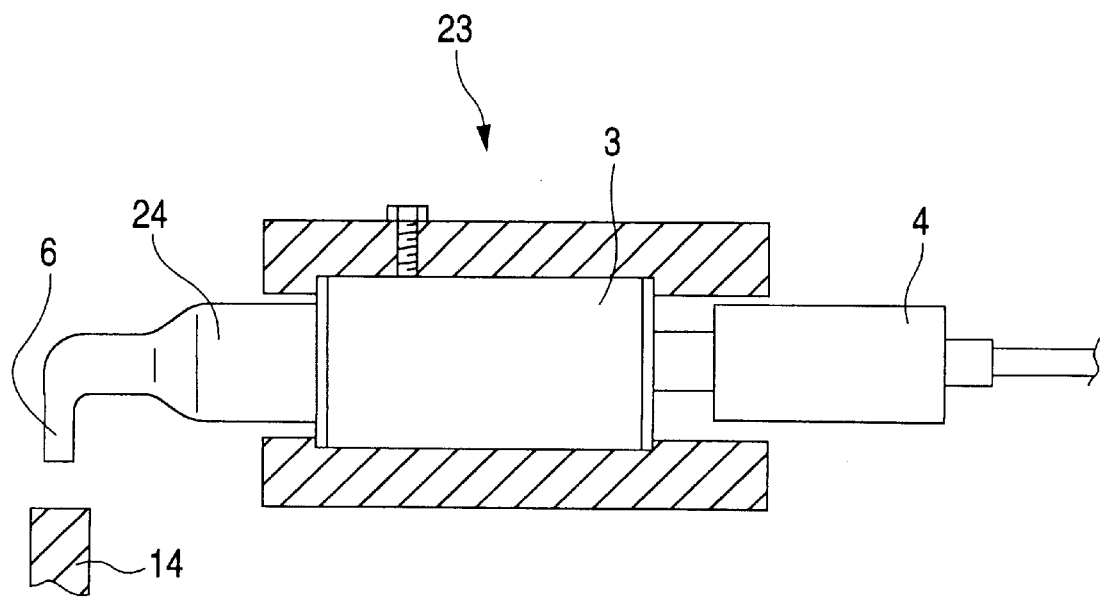
FIG. 4 is a sectional view of a conventional ultrasonic welding apparatus.
Figure 5A:
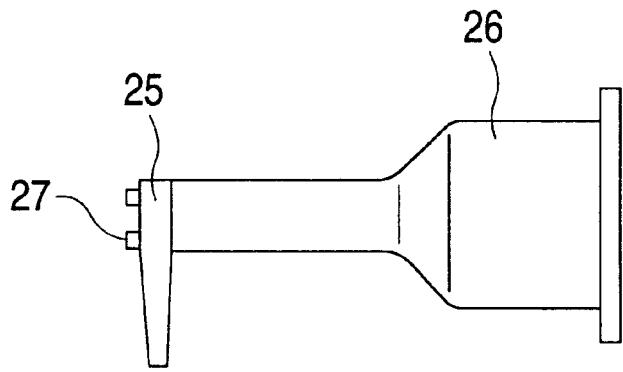
FIG. 5A is a sectional view showing a welding tip which is detachably attached to the horn.
Figure 5B:
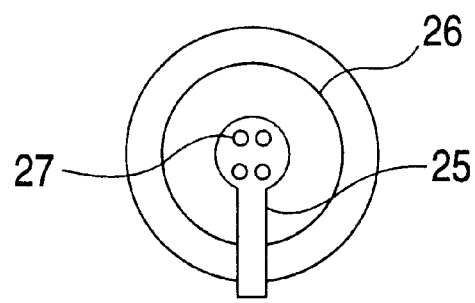
FIG. 5B is a front view of FIG. 5A.

The electric cable terminal treating work by the ultrasonic welding apparatus 1 is carried out as follows. First, a socket terminal 19 from a hopper is moved on rails 20 extending in the left-to-right direction and is positioned on the anvil 14. Then, an electric cable 15 is carried on a transport table 21 from the front toward the socket terminal 19 on the anvil 14. A coating is peeled from the forward end portion of the electric cable 15 so that the conductor core 16 is exposed. When the carrying is completed, the exposed conductor core 16 is in contact with the upper surface of an electrode plate 22 of the socket terminal 19 as shown in FIG. 3.

Then, a user operates the stepping motor 12 rotates the cylinder 11, the booster 3, the horn 5, and the welding tips 6, so that a welding tip having a shape and a size corresponding to the size of the electric cable 15 faces the conductor core 16 of the electric cable 15. This rotation work can be automated if there is a computer system and various sensors for automatically judging the size of the electric cable 15 in order to make the motor 13 rotate by a required angle.

When a welding tip 6 is then vibrated by the booster 3, in a state in which the conductor core 16 of the electric cable 15 and the electrode plate 22 of the socket terminal 19 are moderately pressed to the lower surface of the welding tip 6 by moving the mount 17 relative to the support frame 18, the coating of the contact surface between the conductor core 16 and the electrode plate 22 is broken and recrystallization welding is performed by local vibrational heating so that the socket terminal 19 is attached to the electric cable 15.

Further, where terminal treatment for a certain electric cable is completed and terminal treatment for another electric cable different in size is to be carried out successively, the horn 5 is rotated by the motor 13 to replace the welding tip by a required welding tip. Because the welding tip 6 and the horn 5 need not be removed according to the present invention, the replacement of the welding tip 6 by a new one is completed only by rotating the horn 5 by a required angle so that the welding work can be re-started if the positions and angles to mount the welding tips 6 to the horn 5 are adjusted finely in advance.

Where terminal treatment of a flat cable containing electric wires different in size is to be performed, the welding tip 6 can be rapidly replaced one by one by successively rotating the motor 13, so that electric wires arranged side by side can be continuously attached to the socket terminal without making the individual electric wires of the flat cable rise one by one. Thus, such a special flat cable can be ultrasonically welded.

Although this embodiment shows the case in which the horn 5, the booster 3, the converter 4, and so on, are rotated integrally with each other by means of the motor 13, the invention can be applied to a case in which only the horn 5 is rotated or both the horn 5 and the booster 3 are rotated. When the horn 5 and the booster 3 are united into one body, the transmission of ultrasonic vibrational energy from the booster 3 to the horn 5 is performed efficiently because there is no rotational connection portion between the horn 5 and the booster 3.

Although this embodiment shows the case in which the booster 3 and the horn 5 are moved up and down together with the motor 13, the invention can be applied to a case in which the motor 13 is not moved up and down but the shaft is bent by the coupling 12 so that only the booster 3, and so on, are moved up and down. For this moving up-and-down method, any one of various known methods may be employed.

According to the present invention, because the welding tip can be rapidly replaced by a new one different in shape and size, welding work can be re-started rapidly even in the case where the subject to be welded is changed. Furthermore, ultrasonic welding can be performed even in the case where the subject to be welded, such as a special flat cable, must be welded by using a plurality of welding tips different in shape and size. In addition, because the time of use of each welding tip and the number of times each welding tip is used can be accurately and easily determined if the rotational angle, and the like, of the motor is timely monitored and recorded, the welding apparatus can be used in a production line and managed efficiently.

What is claimed is:

1. An ultrasonic welding apparatus for terminal treatment of an electric cable, comprising:

an exciter unit for generating ultrasonic vibration, said exciter unit including a booster and a converter for converting a voltage or a current from an electric source;

a horn having a forward end and being rotatable about a horizontal longitudinal axis; and a plurality of welding tips projecting from an outer circumferential surface of said forward end of said horn, wherein said welding tips have different shapes and sizes and are rotatable about said horizontal axis;

wherein said welding tip, said horn and said booster are formed into one piece.

2. The ultrasonic welding apparatus according to claim 1, further comprising a connecting case, wherein said booster is rotatably connected to an inner wall of said connecting case.

3. The ultrasonic welding apparatus according to claim 1, further comprising a motor for rotating said horn by a predetermined angle.

4. The ultrasonic welding apparatus according to claim 1, further comprising:

a mount upon which said apparatus is fixed; and a support frame connected to said mount and having an anvil projecting from a forward portion of said frame.

5. The ultrasonic welding apparatus according to claim 1, wherein said exciter and said horn are integrally rotated with each other.

6. The ultrasonic welding apparatus according to claim 3, further comprising:

a means for supporting a bearing; and a coupling connecting said converter and said motor.

* * * * *